US012637314B2

(12) United States Patent
Yamawaki et al.

(10) Patent No.: US 12,637,314 B2
(45) Date of Patent: May 26, 2026

(54) WIRELESS COMMUNICATION DEVICE MANUFACTURING SYSTEM

(71) Applicant: Murata Manufacturing Co., Ltd., Nagaokakyo (JP)

(72) Inventors: Yoshinori Yamawaki, Nagaokakyo (JP); Noboru Kato, Nagaokakyo (JP); Ryosuke Washida, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 828 days.

(21) Appl. No.: 17/964,975

(22) Filed: Oct. 13, 2022

(65) Prior Publication Data

US 2023/0033357 A1     Feb. 2, 2023

Related U.S. Application Data

(63) Continuation of application No. PCT/JP2021/015178, filed on Apr. 12, 2021.

(30) Foreign Application Priority Data

Apr. 14, 2020     (JP) ................................. 2020-072278

(51) Int. Cl.
B65H 23/24          (2006.01)
B65H 20/24          (2006.01)
          (Continued)

(52) U.S. Cl.
CPC ............. B65H 23/24 (2013.01); B65H 20/24 (2013.01); H01Q 1/2283 (2013.01);
          (Continued)

(58) Field of Classification Search
CPC .. B65H 23/24; B65H 20/24; B65H 2404/111; B65H 2404/1441; B65H 2406/342;
          (Continued)

(56) References Cited

U.S. PATENT DOCUMENTS 5,192,064 A  *  3/1993  Rusconi ................. B65H 35/04
                                                    270/52.01
5,957,360 A  *  9/1999  Helinski ................ B65H 23/26
                                                    242/615.12
(Continued)

FOREIGN PATENT DOCUMENTS

JP          H0540247 U       5/1993
JP          2002342735 A     11/2002
          (Continued)

OTHER PUBLICATIONS

Translation of WO-2007043585-A1 (Year: 2007).*
International Search Report in PCT/JP2021/015178, mailed Jun. 15, 2021, 4 pages.

*Primary Examiner* — Jeffrey T Carley
(74) *Attorney, Agent, or Firm* — ArentFox Schiff LLP

(57)          ABSTRACT

A wireless communication device manufacturing system is provided that includes a conveyor that conveys an antenna base material in a manner passing through a mounting position, a mounter that mounts an RFIC module on the antenna base material with an insulating adhesive layer interposed therebetween, a roller pair that nips the antenna base material having the RFIC module mounted thereon in a thickness direction of the antenna base material and presses the RFIC module against the adhesive layer, a first dancer roller freely movably placed on the antenna base material on an upstream side of the mounter, and a second dancer roller freely movably placed on the antenna base material on a downstream side of the roller pair. Moreover, each of the first and second dancer rollers includes a cylindrical portion placed on the antenna base material and locking portions provided at respective ends of the cylindrical portion.

18 Claims, 12 Drawing Sheets

(51) Int. Cl.
    *G06K 19/077*       (2006.01)
    *H01Q 1/22*       (2006.01)

(52) U.S. Cl.
    CPC ................. *B65H 2404/111* (2013.01); *B65H 2404/1441* (2013.01); *B65H 2406/342* (2013.01); *G06K 19/0775* (2013.01)

(58) Field of Classification Search
    CPC ............. H01Q 1/2283; G06K 19/0775; G06K 19/07718; G06K 19/07749; G06K 19/07747
    See application file for complete search history.

(56) References Cited

U.S. PATENT DOCUMENTS

| | | | | |
|---|---|---|---|---|
| 7,726,012 | B2 * | 6/2010 | Endo ................. | H05K 13/0413 |
| | | | | 414/752.1 |
| 10,926,908 | B2 * | 2/2021 | Schlichting ............. | B65B 41/16 |
| 2003/0227528 | A1 * | 12/2003 | Hohberger .......... | B65H 37/002 |
| | | | | 347/104 |
| 2005/0166391 | A1 * | 8/2005 | Berndtsson ...... | G06K 19/07749 |
| | | | | 340/572.7 |
| 2007/0284759 | A1 * | 12/2007 | Suguro ............... | H10W 70/699 |
| | | | | 257/E21.511 |
| 2008/0125994 | A1 * | 5/2008 | Schiebout .......... | G01R 31/2822 |
| | | | | 702/82 |
| 2010/0071207 | A1 * | 3/2010 | Choi .................... | H05K 3/0085 |
| | | | | 118/500 |
| 2011/0241834 | A1 * | 10/2011 | McAllister ....... | G06K 19/07749 |
| | | | | 235/492 |
| 2019/0138871 | A1 * | 5/2019 | Kato ................ | G06K 19/07718 |

FOREIGN PATENT DOCUMENTS

| | | | | |
|---|---|---|---|---|
| JP | 2005209009 | A | 8/2005 | |
| JP | 2005242971 | A | 9/2005 | |
| JP | 2005339502 | A | 12/2005 | |
| JP | 2007108983 | A | 4/2007 | |
| JP | 2010231728 | A | 10/2010 | |
| WO | WO-2007043585 | A1 * | 4/2007 | ............. B65H 37/04 |
| WO | 2018012391 | A1 | 1/2018 | |

* cited by examiner

WIRELESS COMMUNICATION DEVICE MANUFACTURING SYSTEM

CROSS REFERENCE TO RELATED APPLICATIONS

This application is a continuation of PCT Application No. PCT/JP2021/015178, filed Apr. 12, 2021, which claims priority to Japanese Patent Application No. 2020-072278, filed Apr. 14, 2020, the entire contents of each of which are hereby incorporated by reference in their entirety.

TECHNICAL FIELD

The present invention relates to a system and method for manufacturing a wireless communication device.

BACKGROUND

In general, WO 2018/012391 A (hereinafter "Patent Document 1") discloses a method for manufacturing an RFID tag (e.g., a wireless communication device) by conveying a base film, such as an antenna base material, that is provided with an antenna pattern to a mounting position, and by sticking a radio-frequency integrated circuit ("RFIC") element (e.g., an RFIC module) having a sticker to the antenna pattern, at a mounting position. The RFIC element having the sticker stuck on a tape is then picked up, and the picked up RFIC element having the sticker is then bonded (e.g., fixed) to the antenna pattern.

However, in the manufacturing method described in Patent Literature 1, it takes time to pick up an RFIC element having a sticker because it is necessary to peel off and pick up the RFIC element including a sticker from a tape. As a result, it takes time to fix the RFIC element to the antenna base material, which slows down and complicates the manufacturing process.

SUMMARY OF THE INVENTION

Therefore, it is an object of the present invention to fix an RFIC module to an antenna base material that is provided with an antenna pattern, in a short time, for a wireless communication device including an RFIC module that includes an RFIC chip and the antenna pattern.

Accordingly, an exemplary aspect of the present invention provides a wireless communication device manufacturing system that fixes an RFIC module including an RFIC chip to an antenna base material including an antenna pattern. In this aspect, the system includes a conveyor configured to convey the antenna base material to which the RFIC module is to be fixed with an insulating adhesive layer therebetween, in a manner in which the antenna base material passes through a mounting position of the RFIC module; and a mounter configured to mount the RFIC module on the antenna base material with the adhesive layer therebetween, at the mounting position. Moreover, the system includes a roller pair configured to nip the antenna base material having the RFIC module mounted thereon, in a thickness direction of the antenna base material, and presses the RFIC module against the adhesive layer; a first dancer roller freely movably placed on the antenna base material on an upstream side of the mounter in a conveying direction of the antenna base material; and a second dancer roller freely movably placed on the antenna base material on a downstream side of the roller pair in the conveying direction. According to the exemplary aspect, each of the first dancer roller and the second dancer roller includes a cylindrical portion to be placed on the antenna base material and locking portions provided at respective ends of the cylindrical portion.

According to the exemplary aspect of the present invention, for a wireless communication device including an RFIC module that includes an RFIC chip and an antenna pattern, the RFIC module is configured to be fixed to an antenna base material provided with the antenna pattern in short time.

DETAILED DESCRIPTION

Figure 1:
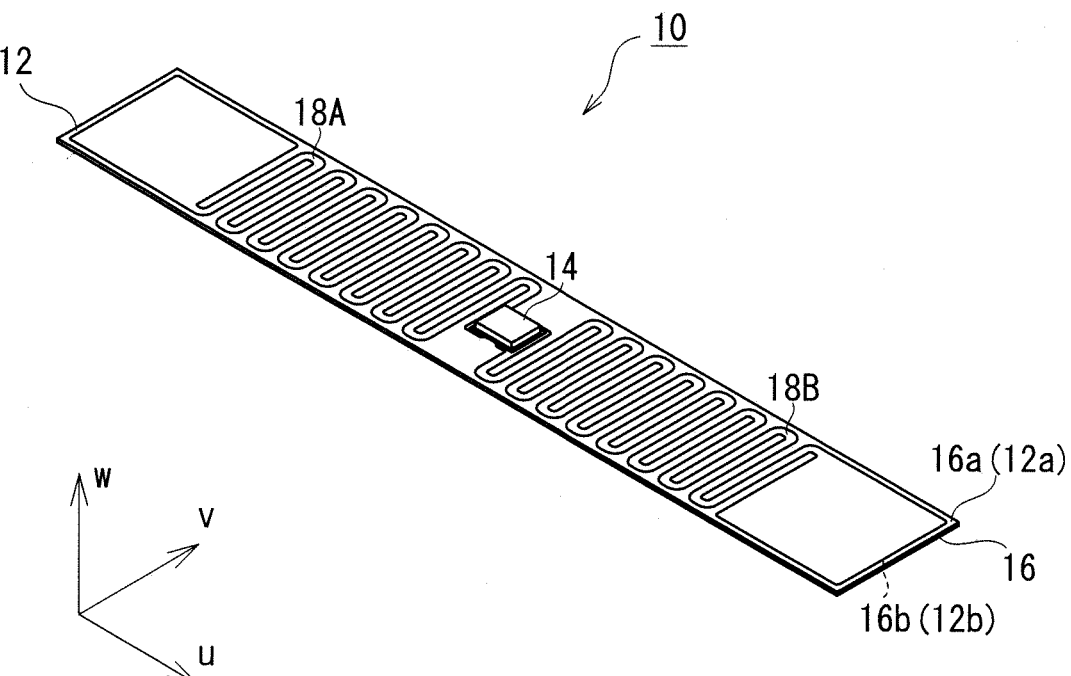
FIG. 1 is a perspective view of an example of a wireless communication device manufactured by a wireless communication device manufacturing system according to an exemplary embodiment.

According to an exemplary aspect, a system for manufacturing a wireless communication device is provided that fixes an RFIC module including an RFIC chip to an antenna base material including an antenna pattern. In this aspect, the system includes a conveyor configured to convey the antenna base material to which the RFIC module is to be fixed with an insulating adhesive layer therebetween, in a manner in which the antenna base material passes through a mounting position of the RFIC module; a mounter configured to mount the RFIC module on the antenna base material with the adhesive layer therebetween, at the mounting position; a roller pair configured to nip the antenna base material having the RFIC module mounted thereon, in a thickness direction of the antenna base material, and to press the RFIC module against the adhesive layer; a first dancer roller freely movably placed on the antenna base material on an upstream side of the mounter in a conveying direction of the antenna base material; and a second dancer roller freely movably placed on the antenna base material on a downstream side of the roller pair in the conveying direction. According to the exemplary aspect, each of the first dancer roller and the second dancer roller includes a cylindrical portion to be placed on the antenna base material and locking portions provided at respective ends of the cylindrical portion.

According to the exemplary aspect, in the wireless communication device including the RFIC module that includes the RFIC chip and the antenna pattern, the RFIC module is configured to be fixed to the antenna base material that is provided with the antenna pattern in a short time.

In an exemplary aspect, the wireless communication device manufacturing system can include a suction table configured to suction and support the antenna base material at the mounting position, and two rollers of the roll pair can be separated from each other to release the antenna base material while the antenna base material is being suctioned by the suction table. When the antenna base material is thin, by causing the roll pair to release the antenna base material, the suction table can suction the antenna base material without wrinkles or slacks.

In an exemplary aspect, after the suction table is caused to suction the antenna base material and the roller pair is then caused to release the antenna base material, the mounter can be configured to mount the RFIC module on the adhesive layer having a pressure-sensitive. In this manner, the mounter can mount the RFIC module on a pressure-sensitive adhesive layer with the antenna base material kept flat without wrinkles or slacks.

In an exemplary aspect, the suction table can be movable up and down, and the suction table can be moved down and separated from the antenna base material while the antenna base material is being conveyed. This configuration suppresses the generation of friction between the antenna base material being conveyed and the suction table, suppresses wearing of at least one of the antenna base material and the suction table, and suppresses generation of static electricity.

In an exemplary aspect, the conveyor can include a collecting reel disposed downstream of the second dancer roller in the conveying direction and configured to wind and collect the antenna base material having the RFIC modules mounted thereon. By being wound around the collecting reel, the RFIC module continues to be pressed against the pressure-sensitive adhesive layer, so that the RFIC module becomes fixed to the pressure-sensitive adhesive layer over time.

In an exemplary aspect, when the roller pair is provided in the conveyor, one of the rollers in the roller pair may be a conveying roller configured to convey the antenna base material.

In an exemplary aspect, the adhesive layer can be provided to a part of the antenna base material, and, in particular, the part to which the RFIC module is to be fixed, in advance.

An embodiment of the present invention will now be explained with reference to the drawings.

Figure 2:
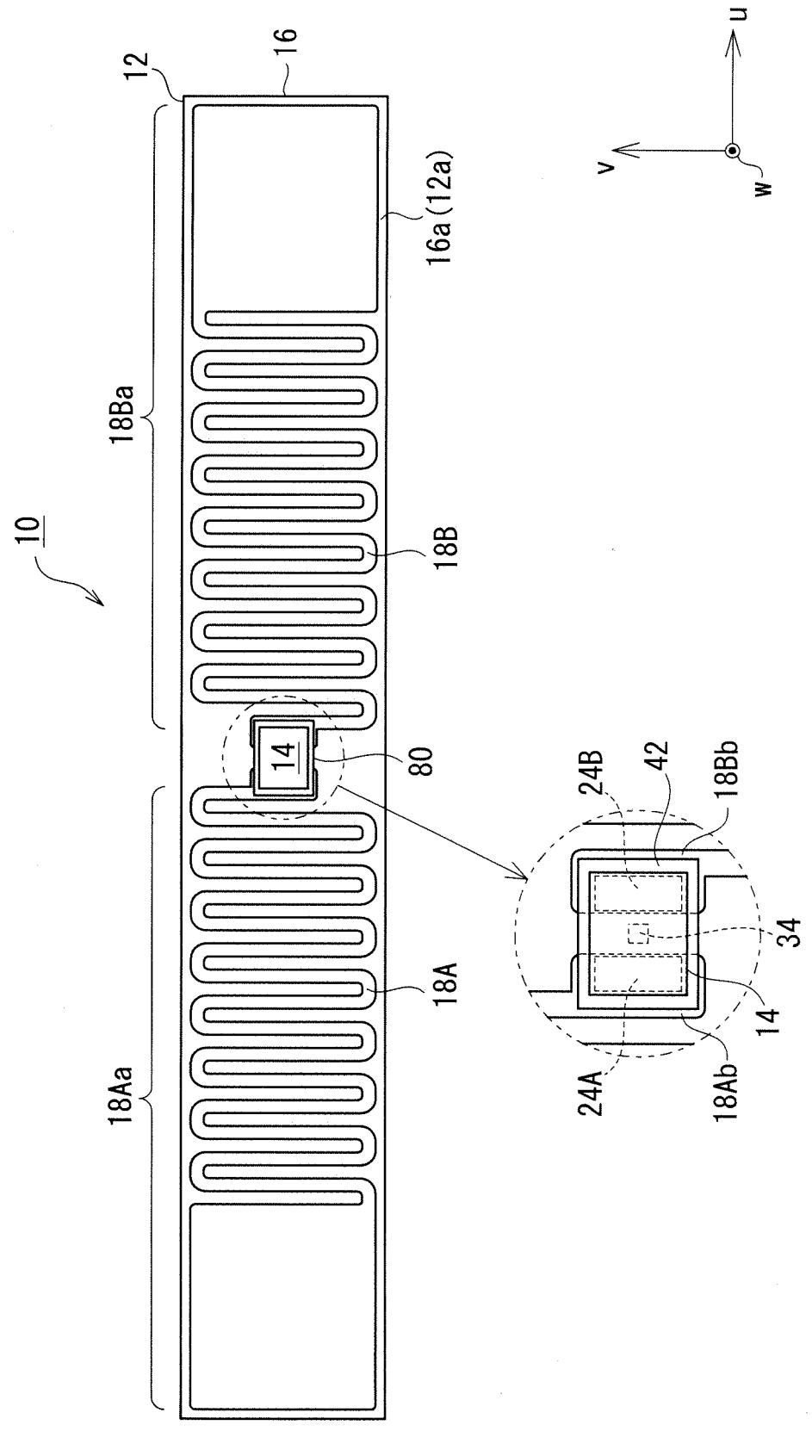
FIG. 2 is a top view of the wireless communication device.

FIG. 1 is a perspective view of an example of a wireless communication device manufactured by a wireless communication device manufacturing system according to an exemplary embodiment, and FIG. 2 is a top view of the wireless communication device. A u-v-w coordinate system in the drawing is provided for facilitating understanding of the exemplary embodiments, and it is not intended to limit the scope of the present invention in any way. The u-axis direction indicates a longitudinal direction, the v-axis direction indicates a width direction, and the w-axis direction indicates a thickness direction of the wireless communication device.

As illustrated in FIGS. 1 and 2, the exemplary wireless communication device 10 has a strip-like shape, and can be configured as a radio-frequency identification (RFID) tag.

Specifically, as illustrated in FIGS. 1 and 2, the wireless communication device 10 includes an antenna member 12 and a radio-frequency integrated circuit (RFIC) module 14 provided on the antenna member 12.

The antenna member 12 included in the wireless communication device 10 has a strip-like shape (e.g., an elongated rectangular shape), and includes an antenna base material 16 and antenna patterns 18A and 18B provided on one surface 16a of the antenna base material 16 (e.g., a first principal surface 12a of the antenna member 12).

Moreover, in the exemplary aspect, the antenna base material 16 is a flexible sheet-like member made of an insulating material such as a polyimide resin. As illustrated in in FIGS. 1 and 2, the antenna base material 16 also has surfaces 16a, 16b functioning as the first principal surface 12a and a second principal surface 12b of the antenna member 12, respectively. Because the antenna base material 16, which is the main component of the antenna member 12, has flexibility, the antenna member 12 can also have flexibility.

In operation, the antenna patterns 18A and 18B are used as antennas for the wireless communication device 10 for wirelessly communicating with an external communication device (e.g., with a reader/writer device when the wireless communication device 10 is used as an RFID tag, for example). In the present exemplary embodiment, the antenna patterns 18A, 18B are conductor patterns that can be made from a metal foil such as that of silver, copper, or aluminum.

Moreover, the antenna patterns 18A and 18B also include emitter units 18Aa and 18Ba, respectively, for transmitting and receiving radio waves, and coupled portions 18Ab and 18Bb (e.g., first and second coupled portions), respectively, for being electrically connected to the RFIC module 14.

In this embodiment, the emitter units 18Aa and 18Ba included in the antenna patterns 18A and 18B, respectively, that are dipole antennas, and have a meandering shape. The emitter units 18Aa and 18Ba also extend from the respective coupled portions 18Ab and 18Bb, provided at a center in the longitudinal direction (i.e., the u-axis direction) of the antenna base material 16 to the respective ends of the antenna base material 16.

The coupled portions 18Ab and 18Bb in the antenna patterns 18A and 18B are electrically connected to terminal electrodes of the RFIC module 14, respectively, although details thereof will be described later. Each of the coupled portions 18Ab and 18Bb is a rectangular land.

Figure 3:
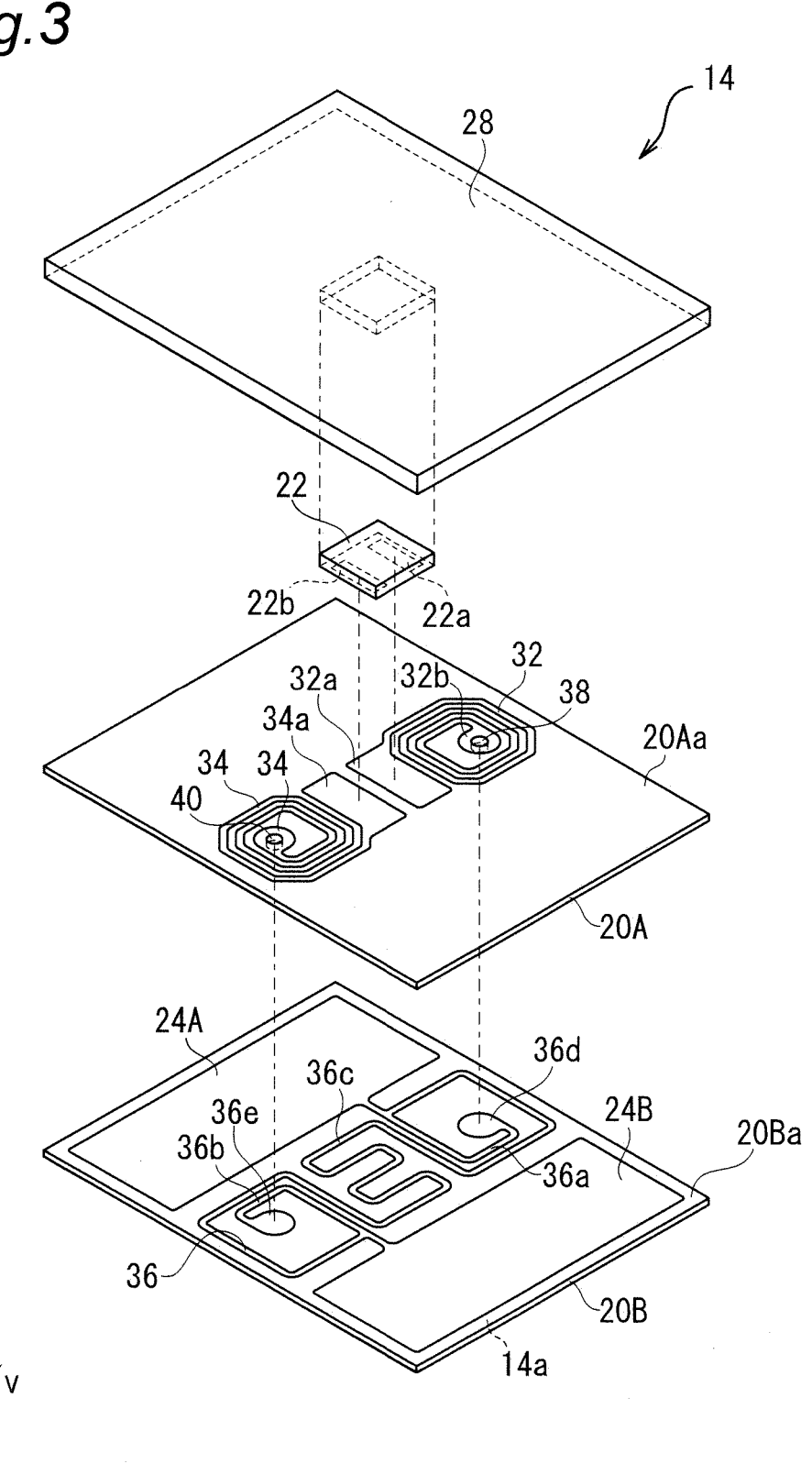
FIG. 3 is an exploded perspective view of an RFIC module.
Figure 4:
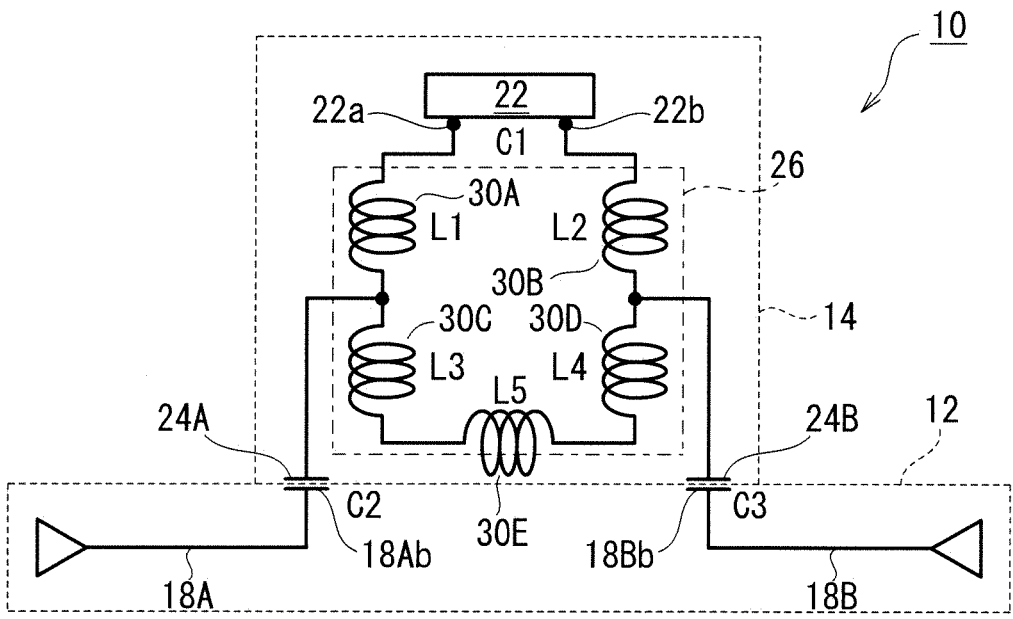
FIG. 4 is an equivalent circuit diagram of a wireless communication device.

FIG. 3 is an exploded perspective view of the RFIC module. FIG. 4 is an equivalent circuit diagram of the wireless communication device.

As illustrated in FIGS. 3 and 4, the RFIC module 14 is a device that is configured to establish wireless communication via the antenna patterns 18A and 18B at a communication frequency of a 900-MHz band, that is, a UHF band, for example.

As illustrated in FIG. 3, in the present embodiment, the RFIC module 14 has a multilayer structure. Specifically, the RFIC module 14 includes two thin plate-like insulating sheets 20A and 20B made of an insulating material and laminated with each other, as a module base material which is a main component. Each of the insulating sheets 20A and 20B is a flexible sheet made of an insulating material, such as polyimide or liquid crystal polymer, for example.

As illustrated in FIGS. 3 and 4, the RFIC module 14 includes an RFIC chip 22 and terminal electrodes 24A and 24B (e.g., first and second terminal electrodes) that are connected to the RFIC chip 22. Moreover, the RFIC module 14 also includes a matching circuit 26 provided between the RFIC chip 22 and the terminal electrodes 24A and 24B. The laminated body including the insulating sheets 20A and 20B, which are module base materials, has a larger planar dimension than the RFIC chip 22. More specifically, in a plan view of the principal surface of the module base materials on which the RFIC chip 22 is to be provided, the outer dimension of the module base materials is larger than the outer dimension of the RFIC chip 22, that it, it has such a relationship that the RFIC chip 22 can be fitted inside the contour of the module base material, for example.

In operation, the RFIC chip 22 is a chip that is driven at a frequency (e.g., a communication frequency) in the UHF band, and has a structure in which various elements are embedded in a semiconductor substrate made of a semiconductor, such as silicon. The RFIC chip 22 also includes a first input/output terminal 22a and a second input/output terminal 22b. The RFIC chip 22 also includes, as illustrated in FIG. 4, an internal capacitance (capacitance: self-capacitance of the RFIC chip itself) C1. At this time, the areas of the terminal electrodes 24A and 24B are larger than the areas of the first input/output terminal 22a and the second input/output terminal 22b, respectively. In this manner, productivity of the wireless communication device 10 is improved. This is because it is easier to align the RFIC module 14 with the antenna patterns 18A, 18B than to align the first and second input/output terminals 22a, 22b of the RFIC chip 22 with the coupled portions 18Ab, 18Bb of the antenna patterns 18A, 18B, directly. Furthermore, according to the exemplary aspect, the RFIC chip 22 is embedded the RFIC module 14, which is a multilayer structure, as illustrated in FIG. 3. Specifically, the RFIC chip 22 is disposed on the insulating sheet 20A and sealed by a resin package 28 formed on the insulating sheet 20A. The resin package 28 is made of an elastomer resin, such as polyurethane or hot-melt resin, for example. The resin package 28 protects the RFIC chip 22. The resin package 28 also improves the flexural rigidity of the RFIC module 14, which is a multilayer structure including the insulating sheets 20A and 20B that are flexible (compared with the rigidity of the insulating sheets alone). As a result, the RFIC module 14 including the embedded RFIC chip 22 can be handled by a component feeder such as a part feeder, which will be as described below, in the same manner as electronic components. It is noted that the RFIC chip 22 alone cannot be handled by a part feeder or the like, because damages such as chipping may occur.

The terminal electrodes 24A and 24B are conductor patterns made of a conductor material such as silver, copper, or aluminum, and are provided on an inner surface 20Ba (e.g., a surface opposite to the first principal surface 14a and facing the insulating sheet 20A) of the insulating sheet 20B that provides the first principal surface 14a of the RFIC module 14. In other words, in the example of the present embodiment, the terminal electrodes 24A and 24B are embedded, without being exposed to the outside of the RFIC module 14. The terminal electrodes 24A and 24B have a rectangular shape. These terminal electrodes 24A and 24B are electrodes for establishing electrical connections to the coupled portions 18Ab and 18Bb of the antenna patterns 18A and 18B, respectively, via the pressure-sensitive adhesive layer 42, in the manner to be described below.

The matching circuit 26 to be provided between the RFIC chip 22 and the terminal electrodes 24A and 24B includes a plurality of inductance elements 30A to 30E, as illustrated in FIG. 4.

In the exemplary aspect, each of the inductance elements 30A to 30E is configured as a conductor pattern provided on the insulating sheet 20A, 20B.

In an outer surface 20Aa (e.g., a surface on which the resin package 28 is provided) of the insulating sheet 20A of the RFIC module 14, conductor patterns 32 and 34 made of a conductor material, such as silver, copper, or aluminum, for example, are provided. Each of the conductor patterns 32 and 34 is a pattern having a spiral coil shape, and includes a land 32a, 34a for establishing an electrical connection with the RFIC chip 22, on one side of its outer periphery. The land 32a is electrically connected to the first input/output terminal 22a of the RFIC chip 22 by solder or conductive adhesive, for example. In the same manner, the land 34a is also electrically connected to the second input/output terminal 22b.

One of the spiral coil-shaped conductor patterns on the insulating sheet 20A, one being the conductor pattern 32, serves as inductance element 30A having an inductance L1, as illustrated in FIG. 4. The other spiral coil-shaped conductor pattern 34 serves as inductance element 30B having an inductance L2.

A conductor pattern 36 made of a conductor material, such as silver, copper, or aluminum, for example, is provided on the insulating sheet 20B that is adjacent to the insulating sheet 20A. The conductor pattern 36 includes the terminal electrodes 24A and 24B, spiral coil portions 36a and 36b, and a meandering portion 36c. In the insulating sheet 20B, the spiral coil portions 36a and 36b and the meandering portion 36c are disposed between the terminal electrodes 24A and 24B.

One of the spiral coil portions included in the conductor pattern 36 on the insulating sheet 20B, that is, the one being the spiral coil portion 36a, is electrically connected to the terminal electrode 24A. An end 36d of the spiral coil portion 36a, that is, the end being on the side near the center, is electrically connected to an end 32b of the spiral coil-shaped conductor pattern 32, the end being on the side near the center, on the insulating sheet 20A, via an interlayer connecting conductor 38, such as a through-hole conductor, that is formed on the insulating sheet 20A. The spiral coil portion 36a is also configured in such a manner that a current flowing through the conductor pattern 32 and a current flowing through the spiral coil portion 36a circulate along the same direction. The spiral coil portion 36a also serves as inductance element 30C having an inductance L3, as illustrated in FIG. 4.

Moreover, the other spiral coil portion 36b of the conductor pattern 36 on the insulating sheet 20B is electrically connected to the terminal electrode 24B. An end 36e of the spiral coil portion 36b, the end being on the side near the center, is electrically connected to an end 34b of the spiral coil-shaped conductor pattern 34, the end being on the side near the center, on the insulating sheet 20A, via an interlayer connecting conductor 40, such as a through-hole conductor, formed on the insulating sheet 20A. The spiral coil portion 36b is also configured in such a manner that a current flowing through the conductor pattern 34 and a current flowing through the spiral coil portion 36b circulate along the same direction. The spiral coil portion 36b also serves as inductance element 30D having an inductance L4, as illustrated in FIG. 4.

The meandering portion 36*c* of the conductor pattern 36 on the insulating sheet 20B electrically connects an end of the one spiral coil portion 36*a* to an end of the other spiral coil portions 36*b*, the ends being those on the outer peripheral side. As illustrated in FIG. 4, the meandering portion 36*c* serves as inductance element 30E having an inductance L5.

With such a matching circuit 26 including the inductance elements 30A to 30E (including the self-capacitance C1 of the RFIC chip 22), the impedances between the RFIC chip 22 and the terminal electrodes 24A and 24B are matched at a predetermined frequency (e.g., the communication frequency). In addition, because the inductance elements 30A to 30E and the RFIC chip 22 form a closed-loop circuit, and the terminal electrodes 24A and 24B are connected to the inductance element 30E, the impedance becomes low in a low frequency range (e.g., in the frequency band of DC to 400 MHz). As a result, even if a high potential difference is formed between the antenna patterns 18A and 18B because of the static electricity as a roll sheet S is conveyed by rolls at a high speed, the voltages of the terminal electrodes 24A and 24B are kept low, so that the RFIC chip 22 does not get destroyed by the static electricity. Furthermore, the RFIC chip 22 can be protected without applying special processing to the roll sheet S, such as an antistatic treatment or a static eliminating blow.

With such a wireless communication device 10, when the antenna patterns 18A and 18B receive a radio wave (e.g., a data signal) at a predetermined frequency (e.g., the communication frequency) in the UHF band, a current corresponding to the signal flows from the antenna patterns 18A and 18B into the RFIC chip 22. By receiving the supply of the current, the RFIC chip 22 is driven to output a current (e.g., a data signal) corresponding to the information stored in a storage unit (not illustrated) internal of the RFIC chip, to the antenna patterns 18A and 18B. The antenna patterns 18A and 18B then emit radio waves (e.g., data signals) corresponding to the current.

In view of the foregoing, the configuration of the wireless communication device 10 has now been explained. A wireless communication device manufacturing system for manufacturing the wireless communication device 10 will be explained as follows.

Figure 5:
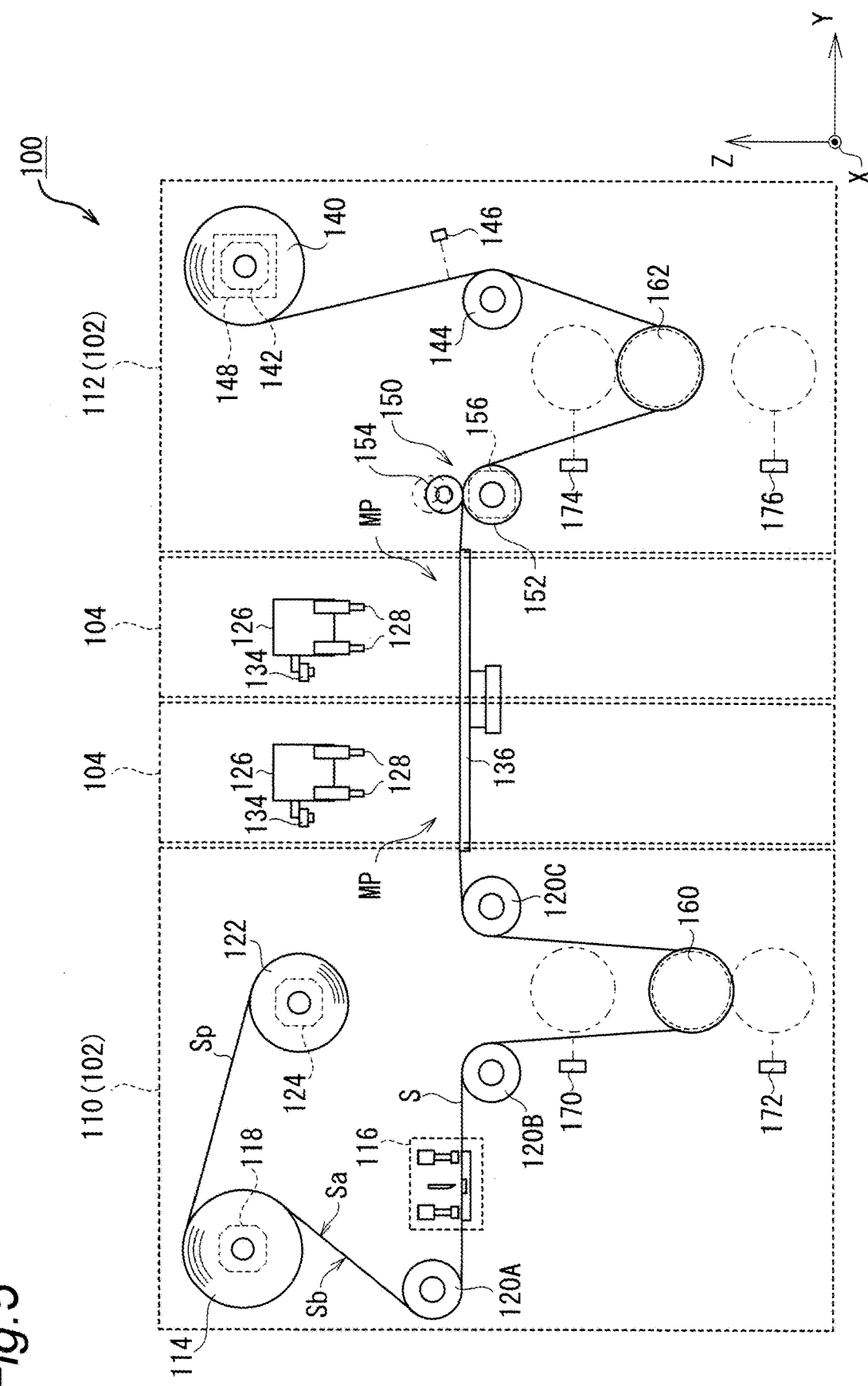
FIG. 5 is a schematic diagram of a configuration of a wireless communication device manufacturing system according to the exemplary embodiment.
Figure 6:
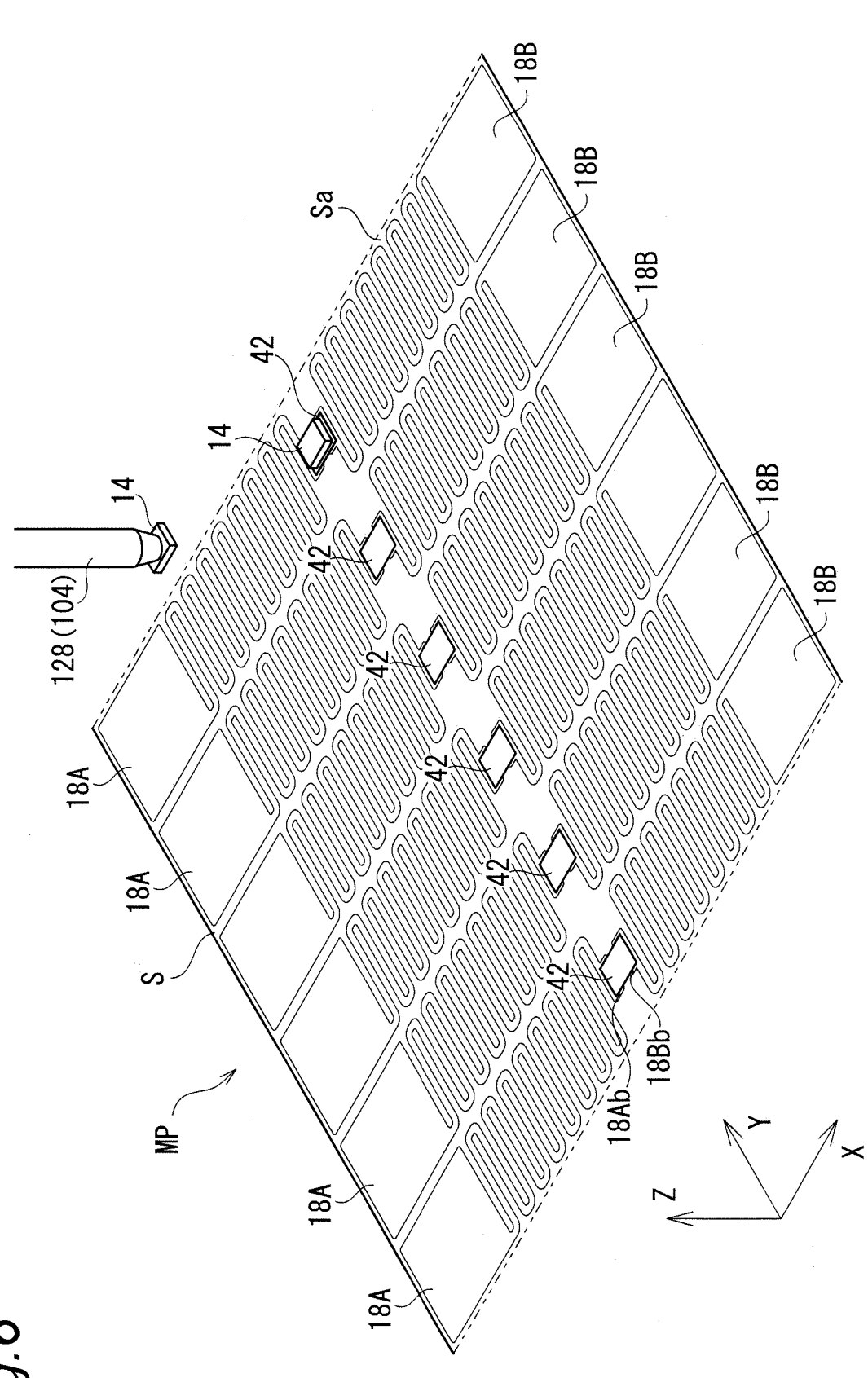
FIG. 6 is a partial perspective view of the wireless communication device manufacturing system during a process of mounting an RFIC module.

In particular, FIG. 5 is a schematic diagram of a configuration of a wireless communication device manufacturing system according to an exemplary embodiment. FIG. 6 is a partial perspective view of the wireless communication device manufacturing system in the process of mounting an RFIC module. It is noted that the X-Y-Z coordinate system illustrated in the drawings is for facilitating understanding of the exemplary embodiment, and is not intended to limit the scope of the present invention in any way. The X-axis direction and the Y-axis direction represent the horizontal directions, and the Z-axis direction represents the height direction.

As illustrated in FIG. 5, this wireless communication device manufacturing system 100 according to the present embodiment includes a conveyor 102 that conveys the roll sheet S, and a mounter 104 that mounts RFIC modules 14 on the antenna patterns 18A and 18B formed on the roll sheet S.

As illustrated in FIG. 6, the wireless communication device manufacturing system 100 is configured to fix an RFIC module 14 to each of the antenna patterns 18A, 18B formed on the roll sheet S. The roll sheet S is the material of the antenna base material 16. After the RFIC module 14 is fixed to the roll sheet S by the wireless communication device manufacturing system 100, the roll sheet S is cut into a plurality of pieces by an apparatus that is different from the wireless communication device manufacturing system 100 (not illustrated). As a result, the wireless communication device 10 illustrated in FIG. 1 is obtained.

In order to fix the RFIC module 14 to the roll sheet S, a pressure-sensitive adhesive layer 42 is provided on the roll sheet S, in advance, at a position where the RFIC module 14 is to be fixed. In the present embodiment, the pressure-sensitive adhesive layer 42 is a layer made of an insulating pressure-sensitive adhesive, and is provided to the roll sheet S by screen printing, for example, in advance. In particular, the pressure-sensitive adhesive is, for example, an olefin-based, acrylic-based, or polyimide-based adhesive. Specifically, the pressure-sensitive adhesive layer 42 is provided on the roll sheet S in a manner covering the coupled portion 18Ab of the antenna pattern 18A and the coupled portion 18Bb of the antenna pattern 18B, with a single piece of pressure-sensitive adhesive layer 42. By fixing the RFIC module 14 on such a pressure-sensitive adhesive layer 42, the coupled portion 18Ab of the antenna pattern 18A and the terminal electrode 24A come to face each other with the pressure-sensitive adhesive layer 42 interposed therebetween. At the same time, the coupled portion 18Bb of the antenna pattern 18B and the terminal electrode 24B come to face each other with the pressure-sensitive adhesive layer 42 interposed therebetween. As a result, as illustrated in in FIG. 4, the coupled portion 18Ab and the terminal electrode 24A are electrically connected via the capacitance C2, and the coupled portion 18Bb and the terminal electrode 24B are electrically connected via the capacitance C3. Preferably, it is ensured that no layer of the air is interposed between the pressure-sensitive adhesive layer 42 and the RFIC module 14. This is intended to prevent a deterioration of the electrical characteristics caused by a change in the coupling capacitance between the RFIC module 14 of the wireless communication device 10 and the antenna pattern 18A, 18B, the change being caused by an expansion an air layer under the RFIC module 14 as a result of the RFIC module 14 going through a temperature change or the like in the actual production environment after the mounting surface of the RFIC module 14 is covered with label paper or a double-sided tape, thereby causing the RFIC module 14 to be pushed up.

As illustrated in FIG. 5, in the present embodiment, the conveyor 102 included in the wireless communication device manufacturing system 100 includes a roll sheet feeder 110 and a roll sheet collector 112. The mounter 104 is disposed between the roll sheet feeder 110 and the roll sheet collector 112.

The conveyor 102 is configured to convey the roll sheet S in the longitudinal direction (e.g., the u-axis direction) so that the roll sheet S is passed through a mounting position at which the mounter 104 mounts the RFIC module 14 on the roll sheet S. In other words, the roll sheet S is conveyed from the roll sheet feeder 110, and passes through the mounter 104 toward the roll sheet collector 112. Note that, although there are two mounters 104 in the present embodiment, the number of mounters 104 may be one or three or more in alternative exemplary aspects.

In the example according to the present embodiment, the roll sheet feeder 110 in the conveyor 102 replaceably includes a feed reel 114 that feeds the roll sheet S. The feed reel 114 is a reel around which the roll sheet S having the pressure-sensitive adhesive layer 42 is wound. By replacing the feed reel 114, manufacturing the wireless communication device 10 can be continued, that is, to keep fixing the RFIC modules 14 onto the roll sheet S continuously. It is also noted that the roll sheet feeder 110 is provided with a sheet connector 116 that connects a trailing end of the roll sheet S where the RFIC module 14 is being mounted in the conveying direction (longitudinal direction, such as the u-axis direction), and a leading end of the roll sheet S of the feed reel 114 having been replaced and newly attached.

In addition, the roll sheet feeder 110 includes a feed reel motor 118 that drives the feed reel 114 in rotation. Furthermore, a plurality of guide rollers 120A, 120B, and 120C for guiding the roll sheet S from the feed reel 114 to the mounting position MP of the mounter 104 are provided.

Furthermore, in the example of the present embodiment, the roll sheet S is wound around the feed reel 114 with a separator sheet Sp placed thereon. The separator sheet Sp is placed on the first surface Sa (i.e., the surface on which the antenna patterns 18A, 18B are to be formed) of the roll sheet S. The separator sheet Sp prevents the pressure-sensitive adhesive layer 42 on the first surface Sa of the roll sheet S from coming off from the first surface Sa and becoming attached to the second surface Sb (i.e., the surface on the opposite side of the first surface Sa). The roll sheet feeder 110 includes a separator sheet collecting reel 122 that collects the separator sheet Sp from the roll sheet S, and a separator sheet collecting motor 124 that drives the collecting reel 122 in rotation.

The mounter 104 mounts the RFIC modules 14 on the roll sheet S supplied from the roll sheet feeder 110.

Figure 7:
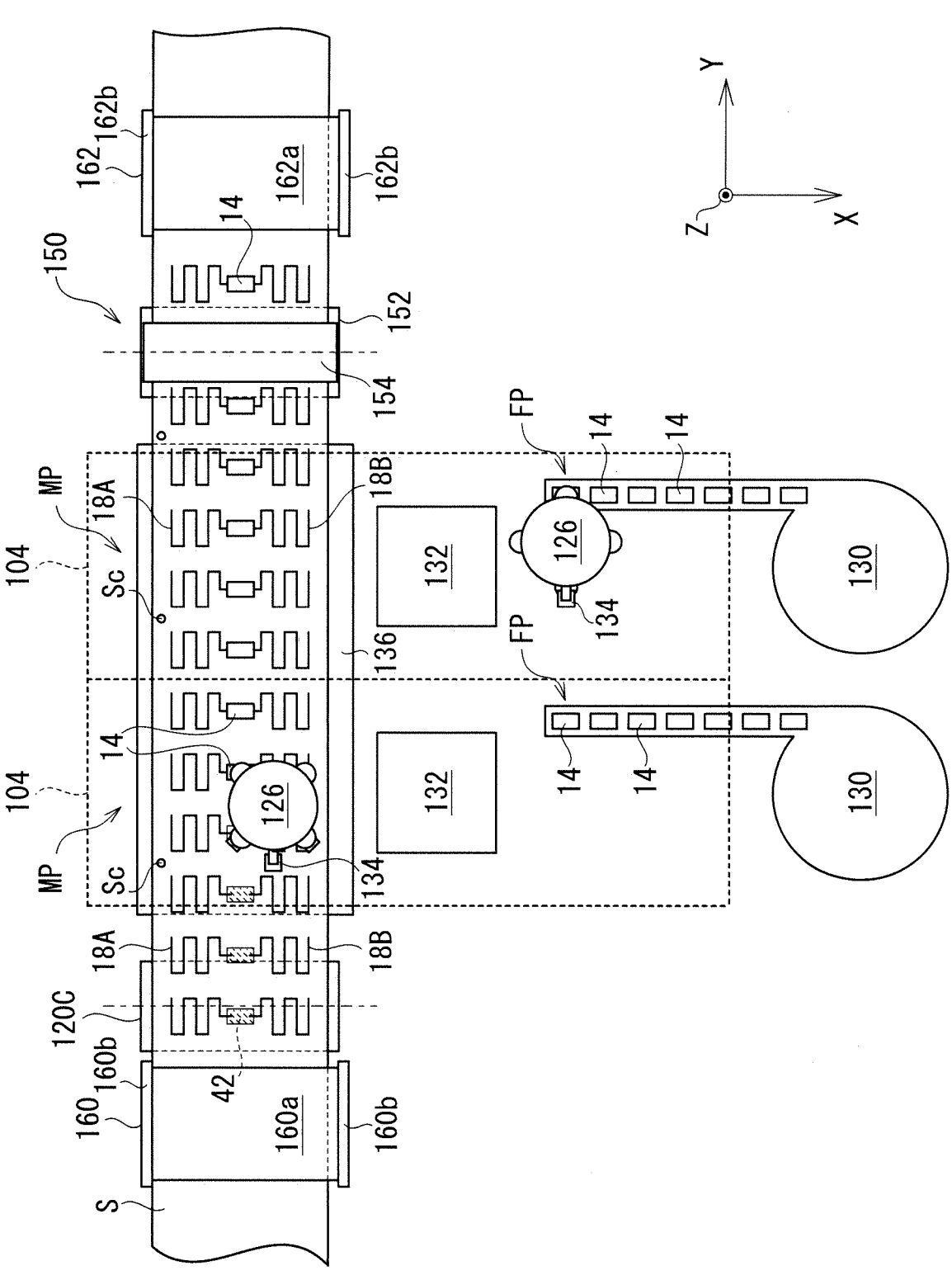
FIG. 7 is a schematic top view of a mounter.

FIG. 7 is a schematic top view of the mounter.

As illustrated in FIG. 7, the mounter 104 includes mounting head 126 that is movable in parallel in the horizontal directions (e.g., the X-axis direction and the Y-axis direction) and the height direction (e.g., the Z-axis direction). As illustrated in FIG. 5, the mounting head 126 is provided with a plurality of nozzles 128 each suctioning and holding an RFIC module 14. The mounting head 126 can be a so-called rotary head, and is configured to support the nozzles 128 in a circular arrangement, in a view in the height direction, and to circulate these nozzles 128 about the center of the circle. Each of the nozzles 128 can also rotate about the center line of the nozzle, the center line passing through the center of the nozzle and extending in the height direction.

Each of the nozzles 128 of the mounting head 126 suctions and holds (e.g., picks up) the RFIC module 14 fed to a feed position FP by the component feeder 130, such as a part feeder. As illustrated in FIG. 3, the component feeder 130 places the RFIC module 14 at the feed position FP with the first principal surface 14a thereof facing downwards.

The mounter 104 includes a camera 132 that captures an image of the RFIC modules 14 having been picked up by the nozzles 128. The camera 132 is disposed between the feed position FP and the mounting position MP, and is configured to capture an image of the mounting head 126 including the nozzles 128 all of which have picked up the RFIC modules 14, from below. The postures and orientation of the RFIC modules 14 having been picked up by the respective nozzles 128 can be detected based on the captured image captured by the camera 132.

The mounter 104 also includes a camera 134 for detecting the position of the pressure-sensitive adhesive layer 42 on the roll sheet S. In the example of the present embodiment, the camera 134 is mounted on the mounting head 126, and captures an image of an alignment mark Sc formed on the roll sheet S at a position having a predetermined positional relationship with the antenna patterns 18A and 18B. By detecting the positions of the alignment marks Sc based on the captured image, the positions of the coupled portions

18Ab and 18Bb in the antenna patterns 18A and 18B can be detected, that is, the positions of the pressure-sensitive adhesive layer 42 on the coupled portions 18Ab and 18Bb. It is also noted that the camera 134 may also be provided to a main body of the mounter 104, instead of being mounted on the mounting head 126.

The mounter 104 (e.g., a controller thereof) is configured to control the position of the mounting head 126 and the rotation angles of the respective nozzles 128 based on the postures and orientation of the RFIC modules 14 having been picked up by the respective nozzles 128 detected based on the captured image from the camera 132, and the positions of the pressure-sensitive adhesive layers 42 detected based on the captured image from the camera 134. As a result, the mounting head 126 can mount the RFIC module 14 on the pressure-sensitive adhesive layer 42 in such a manner that the coupled portion 18Ab of the antenna pattern 18A faces the terminal electrode 24A of the RFIC module 14, and the coupled portion 18Bb of the antenna pattern 18B faces the terminal electrode 24B, as illustrated in FIG. 2.

A suction table 136 is provided to support the roll sheet S from below while the mounting head 126 of the mounter 104 mounts the RFIC module 14 on the roll sheet S (e.g., the pressure-sensitive adhesive layer 42 thereof).

The suction table 136 is configured to hold the roll sheet S by suctioning the roll sheet S. Moreover, the suction table 136 is configured to be movable up and down in the height direction (i.e., in the Z-axis direction). When the mounting of the RFIC modules 14 on all the pressure-sensitive adhesive layers 42 is finished for a part of the roll sheet S on the suction table 136, the suction table 136 stops suctioning and releases the roll sheet S, and moves downwards. The part of the roll sheet S for which the mounting of the RFIC modules 14 has been finished is conveyed to the roll sheet collector 112 included in the conveyor 102.

Returning to FIG. 5, the roll sheet collector 112 of the conveyor 102 includes a collecting reel 140 for winding and collecting the roll sheet S having the RFIC modules 14 mounted thereon, in a replaceable manner. The roll sheet collector 112 also includes a collecting reel motor 142 that drives the collecting reel 140 in rotation. A guide roller 144 that guides the roll sheet S from the mounter 104 to the collecting reel 140 is also provided. The collecting reel 140 which collection of the roll sheet S has been finished is removed from the roll sheet collector 112 and conveyed to a post-process device, for example, a device (not illustrated) for cutting the roll sheet S into a plurality of pieces to create the wireless communication device 10.

In the example of the present embodiment, the roll sheet collector 112 includes an edge position control ("EPC") sensor 146 that detects the edges of the roll sheet S in the width direction (i.e., the X-axis direction). The roll sheet collector 112 also includes an actuator 148 that moves the collecting reel 140 back and forth in directions in which the rotational center line thereof extends (i.e., X-axis directions). Based on the positions of the edges (i.e., the positions in the X-axis direction) of the roll sheet S detected by the EPC sensor 146, the actuator 148 moves the collecting reel 140 back and forth to adjust its position (i.e., position in the X-axis direction). Accordingly, the collecting reel 140 can wind the roll sheet S with the edges thereof aligned in the width direction.

In addition, as illustrated in FIG. 5, the wireless communication device manufacturing system 100 includes a roller pair 150 for holding the roll sheet S, along a path by which the roll sheet S is conveyed from the mounter 104 to the collecting reel 140.

In the example of the present embodiment, the roller pair 150 is provided to the roll sheet collector 112 included in the conveyor 102. The roller pair 150 includes a sheet conveying roller 152 and a nip roller 154.

In the example of the present embodiment, the sheet conveying roller 152 is driven in rotation by the sheet conveying motor 156, and functions as a conveying unit of the conveyor 102 that conveys the roll sheet S. The nip roller 154 is, for example, a freely rotatable urethane roller, and is moved up and down by an actuator (not illustrated). By being moved up and down, the nip roller 154 approaches or separates from the sheet conveying roller 152. When the nip roller 154 approaches the rotating sheet conveying roller 152, the roll sheet S is conveyed by being nipped between these rollers 152 and 154.

When the roll sheet S is passed between the sheet conveying roller 152 and the nip roller 154 forming the roller pair 150, the RFIC modules 14 mounted on the respective pressure-sensitive adhesive layers 42 by the mounter 104 are pressed against the respective pressure-sensitive adhesive layers 42.

Specifically, in the present embodiment, the RFIC modules 14 are incrementally fixed to the pressure-sensitive adhesive layers 42. To begin with, the RFIC modules 14 are temporarily fixed to the pressure-sensitive adhesive layers 42, respectively, by being mounted by the nozzles 128 of the mounting head 126 in the mounter 104. When the nozzle 128 presses the RFIC module 14 against the pressure-sensitive adhesive layer 42 at a load of 10 g to 100 g, for example, the RFIC module 14 is fixed temporarily to the pressure-sensitive adhesive layer 42.

The roll sheet S having the RFIC modules 14 temporarily fixed thereto are then passed between the sheet conveying roller 152 and the nip roller 154 forming the roller pair 150. As a result, the RFIC modules 14 are fully fixed by being pressed against the pressure-sensitive adhesive layers 42, respectively, at a force of about 0.2 MPa, for example.

The roll sheet S having the RFIC modules 14 fully fixed thereto by the roller pair 150 is wound around the collecting reel 140. In this manner, the RFIC modules 14 keeps being pressed against the respective pressure-sensitive adhesive layers 42, and the RFIC modules 14 become fixed to the respective pressure-sensitive adhesive layers 42 over time.

Furthermore, the wireless communication device manufacturing system 100 includes a first dancer roller 160 and a second dancer roller 162, as illustrated in in FIG. 5.

The first dancer roller 160 and the second dancer roller 162 are provided, with the mounter 104 interposed therebetween. Specifically, the first dancer roller 160 is disposed upstream of the mounter 104 in the conveying direction of the roll sheet S, and, in the example of the present embodiment, disposed between the feed reel 114 and the mounter 104, along the path by which the roll sheet S is conveyed. The second dancer roller 162 is disposed on the downstream of the roller pair 150 in the conveying direction of the roll sheet S, and, in the example of the present embodiment, is disposed between the roller pair 150 and the collecting reel 140, along the path by which the roll sheet S is conveyed.

The first dancer roller 160 and the second dancer roller 162 are freely movable, that is, are supported neither by the conveyor 102, such as the roll sheet feeder 110 and the roll sheet collector 112, nor by the mounter 104. The first dancer roller 160 and the second dancer roller 162 are placed on the roll sheet S, and are kept in contact with the roll sheet S by their own weight.

Figure 8:
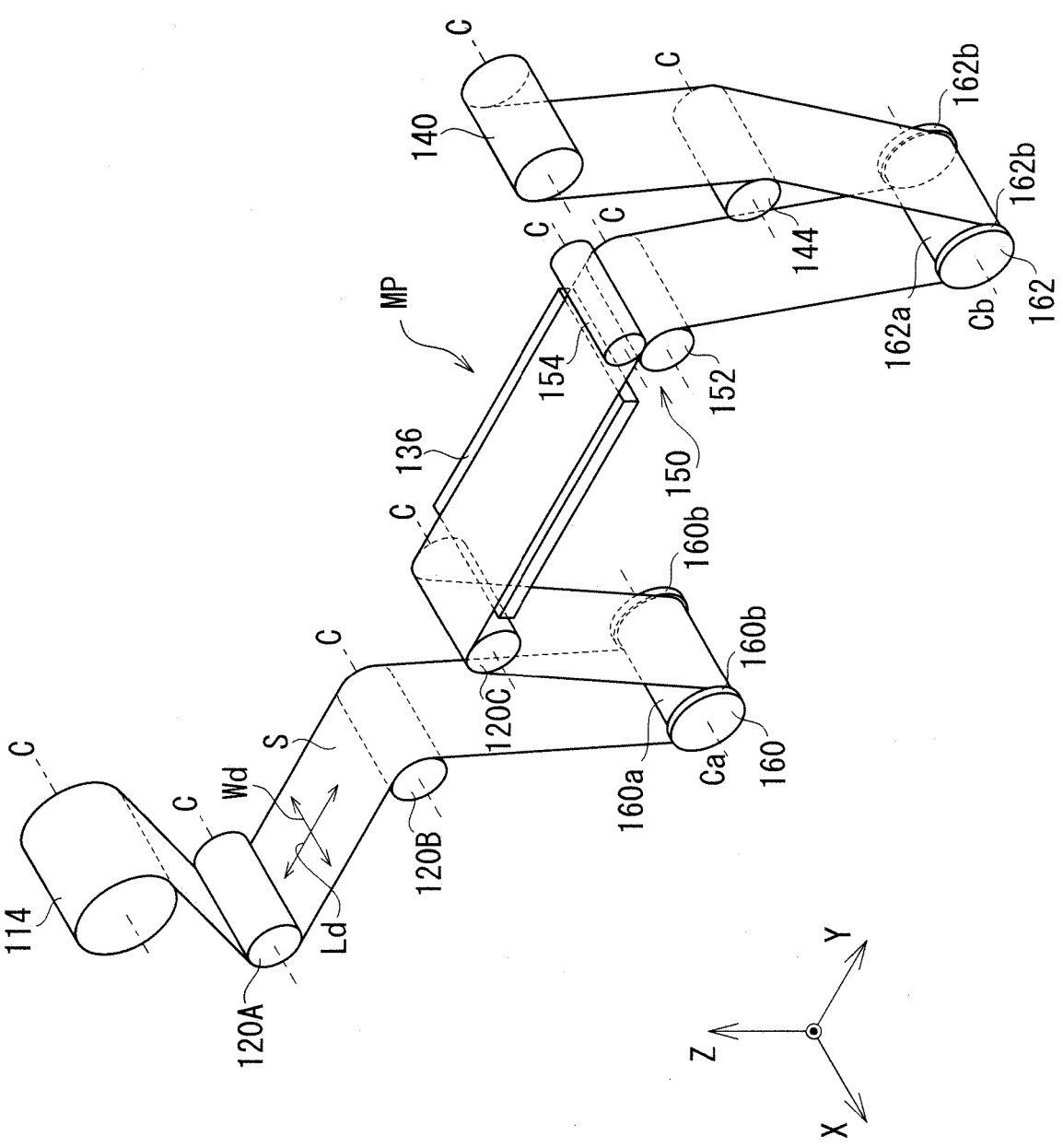
FIG. 8 is a perspective view illustrating a plurality of rollers involved in conveyance of a roll sheet.

FIG. 8 is a perspective view illustrating the rollers involved in the conveyance of the roll sheet.

As illustrated in FIG. 8, the rollers 120A, 120B, 120C, 144, 152, and 154 and the reels 114 and 140, excluding the first dancer roller 160 and the second dancer roller 162, are rotatably supported by the conveyor 102 (the roll sheet feeder 110 and the roll sheet collector 112) about the respective rotational center lines C that are parallel to each other. The roll sheet S is conveyed in a longitudinal direction Ld in such an orientation that the width direction Wd thereof is substantially parallel with the direction by which the rotational center lines C of the rollers and the reels other than the first dancer roller 160 and the second dancer roller 162 extend (i.e., in the X-axis direction). Therefore, each of the first dancer roller 160 and the second dancer roller 162 placed on the roll sheet S is also rolled by the conveyed roll sheet S, about a rotational center line Ca and a rotational center line Cb, respectively, that extend substantially in the width direction Wd of the roll sheet S. As a result, the first dancer roller 160 and the second dancer roller 162 rotate about the respective rotational center lines Ca and Cb that are parallel with the rotational center lines C of the other rollers and reels, respectively.

As further shown, the first dancer roller 160 and the second dancer roller 162 include a cylindrical portion 160a and a cylindrical portion 162a, respectively, that are placed on the roll sheet S, and locking portions 160b and locking portions 162b, respectively, that are provided at respective ends of the cylindrical portions and that lock the roll sheet S so that the first dancer roller 160 and the second dancer roller 162 do not fall from the roll sheet S. With the roll sheet S locked to the locking portions 160b and the locking portions 162b, the first dancer roller 160 and the second dancer roller 162 can stay on the roll sheet S. The distance between the two locking portions 160b of the first dancer roller 160 and the distance between the two locking portions 162b of the second dancer roller 162 are greater than the width W of the roll sheet S. Furthermore, the outer circumferential surfaces of the cylindrical portions 160a and 160b of the first dancer roller 160 and the second dancer roller 162 are subjected to surface treatment such as coating treatment so that the pressure-sensitive adhesive layers 42 are not transferred from the roll sheet S to the cylindrical portions 160a and 160b.

The functions of the first dancer roller 160 and the second dancer roller 162 are explained as follows.

To begin with, as a first function, the first dancer roller 160 and the second dancer roller 162 suppress meandering of the roll sheet S. For purposes of this disclosure, the term "meandering" as used herein means a condition where the roll sheet S is conveyed in a posture different from the normal posture. In the present embodiment, the normal posture of the roll sheet S is a posture where the longitudinal direction Ld of the roll sheet S is matched with the conveying direction of the roll sheet S.

Figure 9:
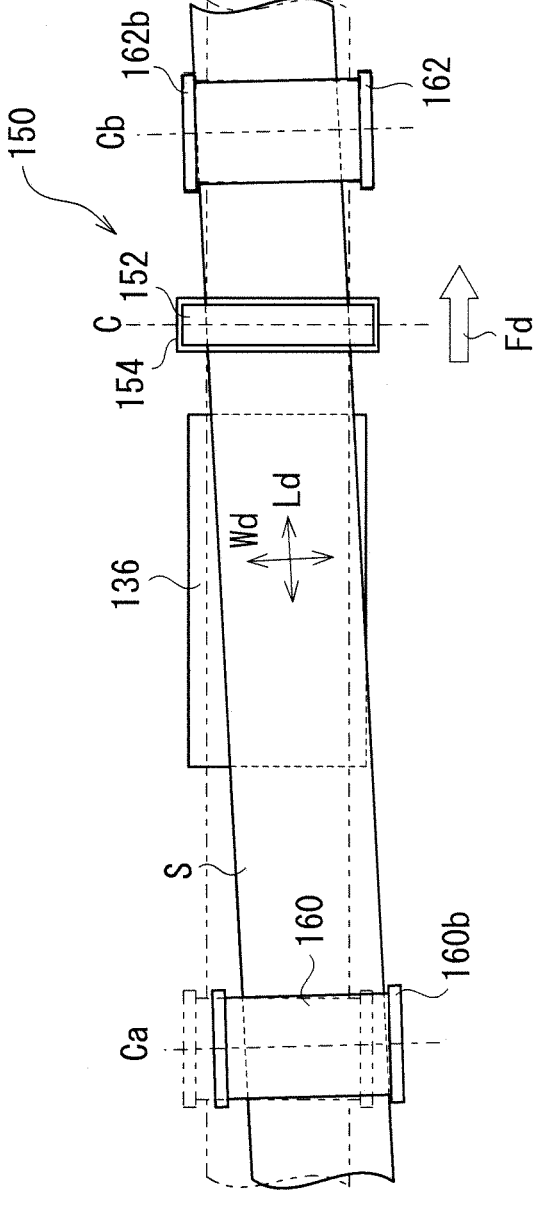
FIG. 9 is a schematic illustrating a roll sheet when meandering occurs.
Figure 9:
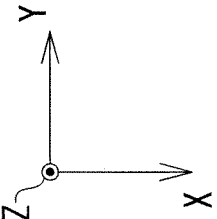

FIG. 9 is a schematic illustrating the roll sheet when meandering occurs.

As illustrated in FIG. 9, meandering may occur while the roll sheet S is being conveyed in the longitudinal direction Ld. In FIG. 9, the roll sheet S, and the first dancer roller 160 and the second dancer roller 162 before meandering occurs are indicated by two-dot chain lines.

Meandering of the roll sheet S, such as that as illustrated in FIG. 9 can occur due to various reasons. As an example, the roll sheet S may slip between the sheet conveying roller 152 and the nip roller 154 forming the roller pair 150. Specifically, when a part of the roll sheet S slips between the sheet conveying roller 152 and the nip roller 154, a conveyed amount of the roll sheet S on one side in the width direction Wd may become different from a conveyed amount on the other side of the roll sheet S, and thus the entire roll sheet S may become tilted with respect to the conveying direction Fd.

When such meandering of the roll sheet S occurs in the mounter 104 and the meandering persists, the pressure-sensitive adhesive layers 42 on the roll sheet S may not to be conveyed to the mounting position MP. As a result, there is a possibility that the mounter 104 fails to mount the RFIC modules 14 correctly on the respective pressure-sensitive adhesive layers 42. As another example, there is a possibility that the camera 134 of the mounter 104 fails to detect the alignment marks Sc on the roll sheet S.

As illustrated in FIG. 9, when meandering of the roll sheet S occurs, the first dancer roller 160 and the second dancer roller 162 on the roll sheet S become displaced. As a result, the rotational center line Ca of the first dancer roller 160 and the rotational center line Cb of the second dancer roller 162 become tilted. In other words, the rotational center line Ca of the first dancer roller 160 and the rotational center line Cb of the second dancer roller 162 become displaced from their positions that are in parallel with the rotational center line C of the sheet conveying roller 152 included in the roller pair 150, to positions that are not in parallel therewith.

At this time, the first dancer roller 160 and the second dancer roller 162 return to the postures, as indicated by the two-dot chain lines, before the meandering of the roll sheet S occurs. Specifically, even when the roll sheet S becomes tilted, the conveying direction Fd of the sheet conveying roller 152 of the roller pair 150 remains the same. Therefore, the roll sheet S being conveyed in the conveying direction Fd exerts a force for causing the first dancer roller 160 and the second dancer roller 162 to roll about their rotational center lines extending in the directions orthogonal to the conveying direction Fd. As a result, the first dancer roller 160 and the second dancer roller 162 are brought back to the postures before the meandering occurs, where their respective rotational center lines Ca and Cb are positioned parallel with the rotational center line C of the sheet conveying roller 152. At that time, the locking portions 160b and 162b are brought into contact with the titled roll sheet S, and the roll sheet S is brought back to the position before the meandering occurs. As a result, the meandering of the roll sheet S is suppressed by this recovering behavior of the first dancer roller 160 and the second dancer roller 162.

As a second function, the first dancer roller 160 and the second dancer roller 162 function as tension rollers that apply tension to the roll sheet S. Specifically, the first dancer roller 160 and the second dancer roller 162 keep the part of the roll sheet S positioned therebetween flat, that is, the part of the roll sheet S positioned at the mounting position MP. With this second function, the suction table 136 located at the mounting position MP can suction and hold the roll sheet S, without wrinkling or slacking of the roll sheet S. As a result, the mounter 104 can mount the RFIC modules 14 correctly on the pressure-sensitive adhesive layers 42 of the roll sheet S. In the example of the present embodiment, once the suction table 136 suctions the roll sheet S, the roller pair 150 releases the roll sheet S (e.g., the nip roller 154 separates from the sheet conveying roller 152) so as to facilitate flattening of the part of the roll sheet S between the first dancer roller 160 and the second dancer roller 162. In this exemplary aspect, the first dancer roller 160 and the second dancer roller 162 preferably have substantially the same weights. If their weight difference is too large, immediately after the roller pair 150 releases the roll sheet S, the roll sheet S being suctioned by the suction table 136 may move toward the heavier dancer roller.

Furthermore, as a third function, the first dancer roller 160 and the second dancer roller 162 function as buffer rollers for buffering the roll sheet S. Specifically, as illustrated in FIG. 5, the roll sheet S is slackened by the first dancer roller 160 and the second dancer roller 162, so that the roll sheet S of a predetermined buffered amount is buffered on the upstream side and the downstream side in the conveying direction of the roll sheet S with respect to the mounter 104. The reason why the roll sheet S is buffered will be described below. In addition, in order to detect the amount buffered, a plurality of position sensors 170 to 176 for detecting the first dancer roller 160 and the second dancer roller 162 are provided.

With respect to the first dancer roller 160, an upper position sensor 170 is disposed at a position of the first dancer roller 160 at its upper position, that is, disposed at a position configured to detect the first dancer roller 160 when to small amount of the roll sheet S is buffered. A lower position sensor 172 is disposed at a position capable of detecting the first dancer roller 160 at its lower position, that is, disposed at a position configured to detect the first dancer roller 160 when a large amount of the roll sheet S is buffered.

When the lower position sensor 172 detects the first dancer roller 160, a predetermined amount of the roll sheet S is buffered on the upstream of the mounter 104. When the upper sensor 170 detects the first dancer roller 160, the amount by which the roll sheet S is buffered is insufficient, and therefore, it is necessary to increase the buffered amount.

With respect to the second dancer roller 162, the upper position sensor 174 is disposed at a position configured to detect the second dancer roller 162 at the upper position, that is, disposed at a position configured to detect the second dancer roller 162 when a small amount of the roll sheet S is buffered. In addition, the lower position sensor 176 is disposed at a position configured to detect the second dancer roller 162 at the lower position, that is, disposed at a position configured to detect the second dancer roller 162 when a large amount of the roll sheet S is buffered.

When the lower position sensor 176 detects the second dancer roller 162, a predetermined amount of the roll sheet S is buffered on the downstream of the mounter 104. When the upper position sensor 174 detects the second dancer roller 162, the buffer of buffered roll sheet S is insufficient, and therefore, it is necessary to increase the buffered amount.

The configuration of the wireless communication device manufacturing system has been explained above. An operation of the wireless communication device manufacturing system will now be explained.

Figure 10:
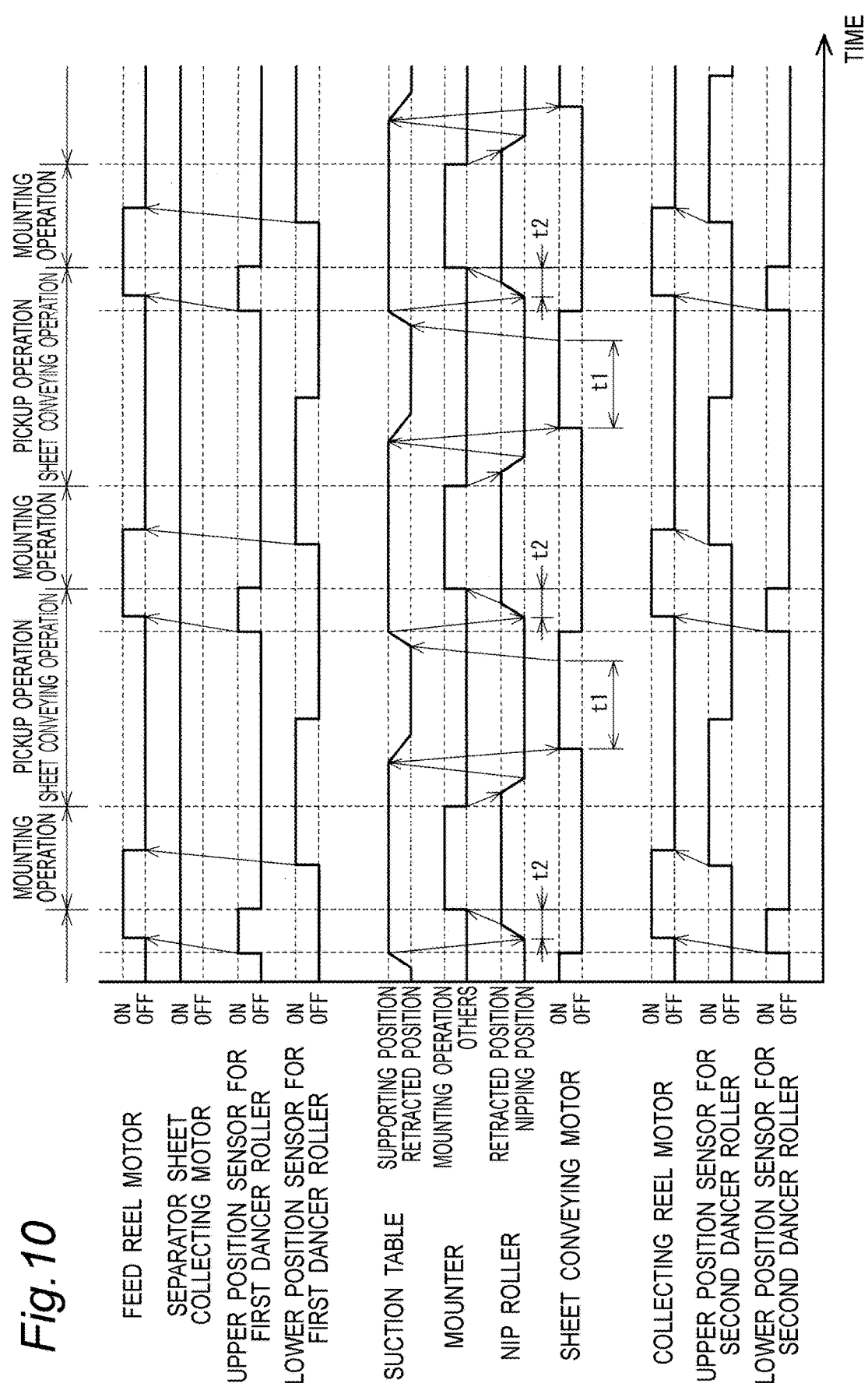
FIG. 10 is a timing chart of an operation of the wireless communication device manufacturing system.
Figure 11:
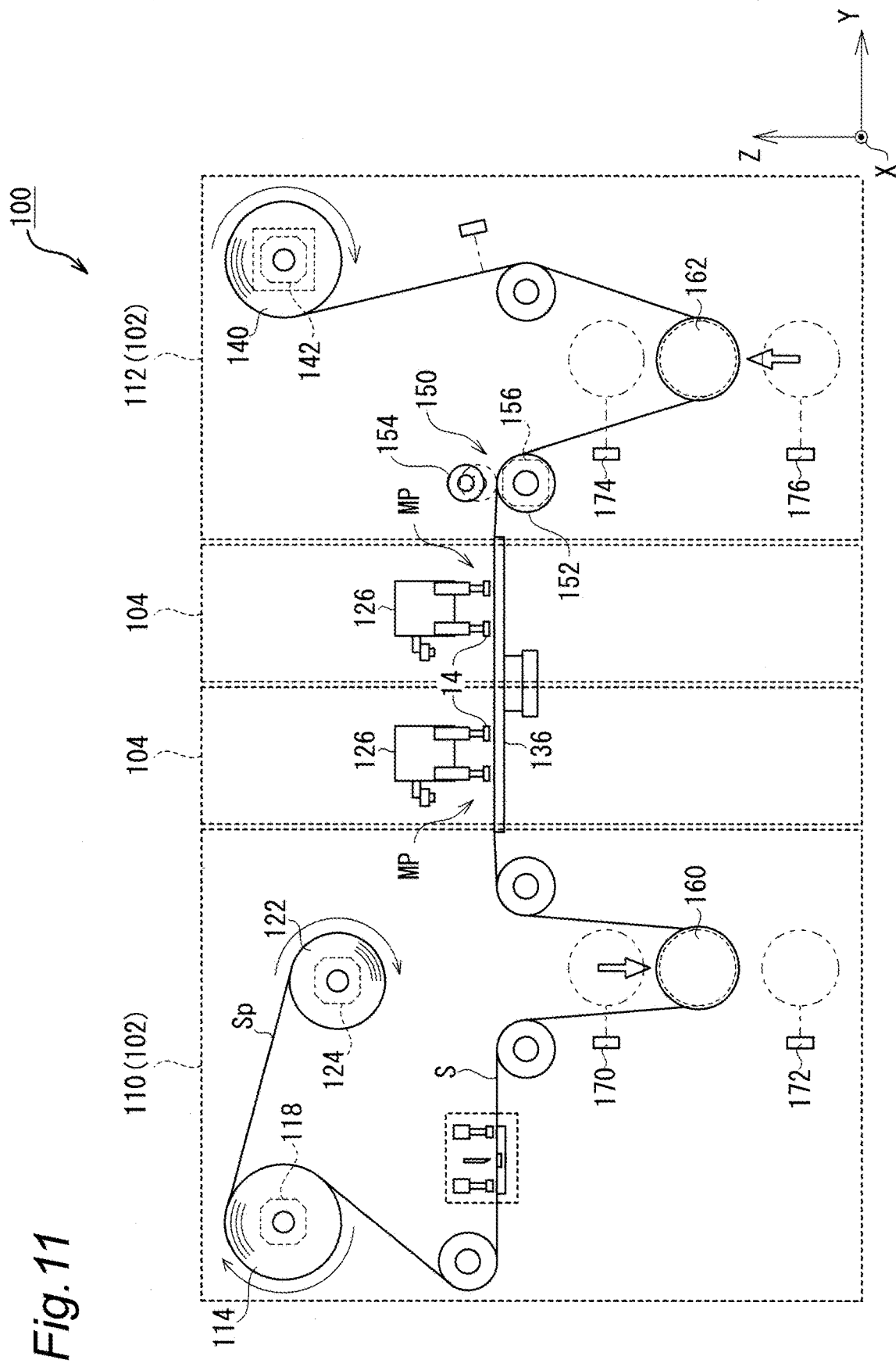
FIG. 11 is a schematic illustrating the wireless communication device manufacturing system in the process of mounting an RFIC module.
Figure 12:
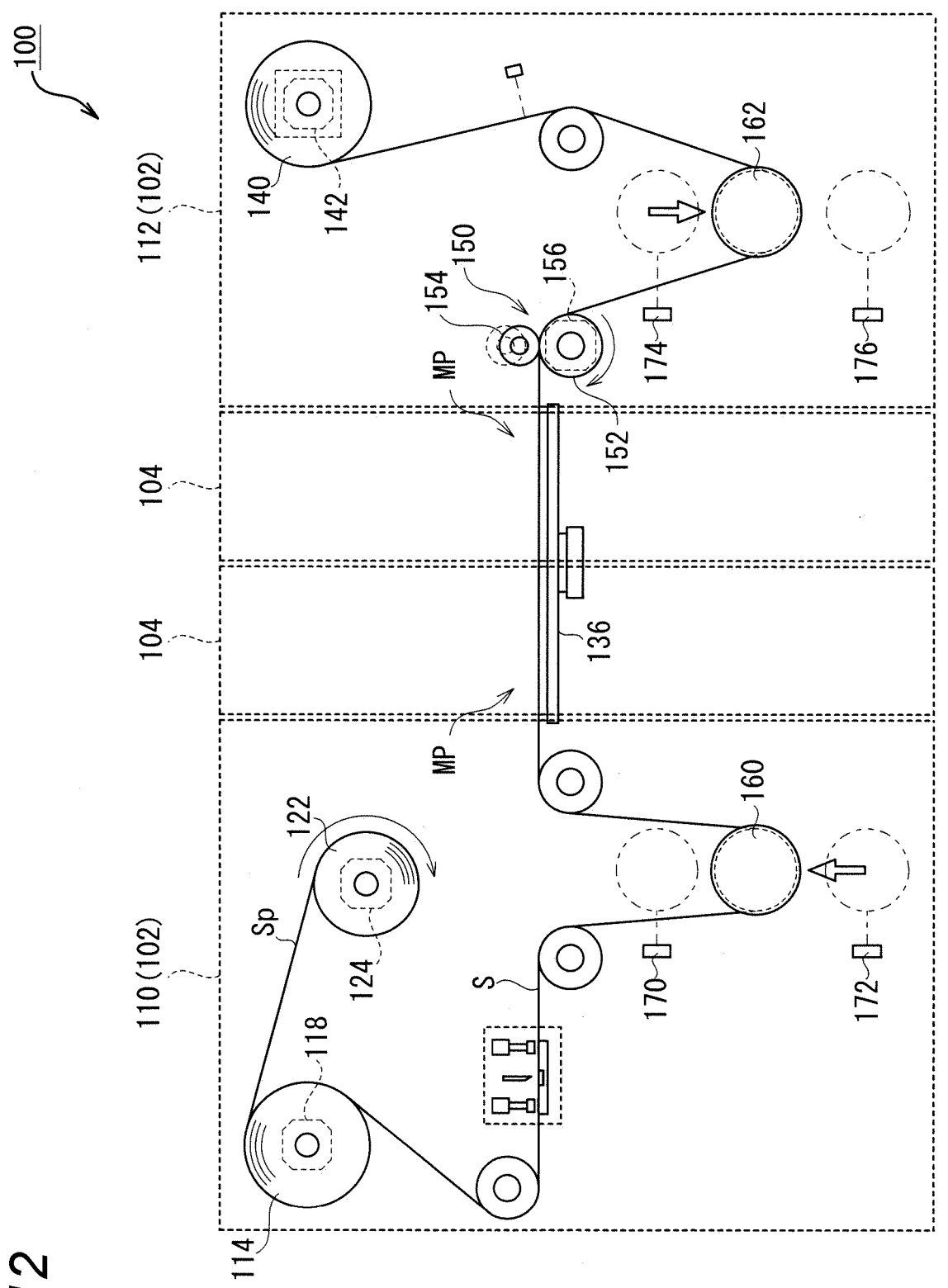
FIG. 12 is a schematic illustrating a wireless communication device manufacturing system conveying a part of the roll sheet, the part having an RFIC module mounted thereon, out of the mounter.

In particular, FIG. 10 is a timing chart of the operation of the wireless communication device manufacturing system according to an exemplary aspect. FIG. 11 is a schematic illustrating the wireless communication device manufacturing system in the process of mounting an RFIC module. FIG. 12 is a schematic illustrating a wireless communication device manufacturing system in the process of conveying a part of the roll sheet having the RFIC modules mounted thereon, from the mounter.

As illustrated in FIG. 10, the wireless communication device manufacturing system is configured to repeat the mounting operation for mounting the RFIC modules 14 on the roll sheet S, and operations other than the mounting operation as one cycle. The operations other than the mounting operation include a pickup operation in which the mounting head 126 picks up the RFIC modules 14 at the feed position FP as illustrated in FIG. 7, and a sheet conveying operation for conveying the roll sheet S for which the mounting of the RFIC module 14 at the mounting position MP has been finished, from the mounter 104.

As illustrated in FIGS. 10 and 11, while the mounting head 126 is mounting the RFIC modules 14 on the roll sheet S, the suction table 136 is disposed at the supporting position, and keeps suctioning and holding the roll sheet S to support the roll sheet S. At this time, the nip roller 154 of the roller pair 150 is kept away from the sheet conveying roller 152 (e.g., located at the retracted position). In other words, at this time, the roll sheet S is not held by the roller pair 150. The sheet conveying motor 156 has been stopped, so that the sheet conveying roller 152 is not rotated.

While the RFIC modules 14 are being mounted on the roll sheet S, the roll sheet feeder 110 included in the conveyor 102 feeds the roll sheet S from the feed reel 114 toward the mounter 104 by causing the feed reel motor 118 to rotate the feed reel 114, and by causing the first dancer roller 160 to move down by its own weight. When a predetermined buffered amount of the roll sheet S has been buffered on the upstream side of the mounter 104, that is, when the lower position sensor 172 for the first dancer roller detects the first dancer roller 160 (when the sensor 172 is turned on), the feed reel motor 118 stops (turns off) driving the feed reel 114 in rotation.

While the RFIC modules 14 are being mounted on the roll sheet S, the roll sheet collector 112 included in the conveyor 102 causes the roll sheet S buffered by the second dancer roller 162 to become wound around the collecting reel 140 by causing the collecting reel motor 142 to rotate the collecting reel 140. When the buffered amount of the roll sheet S buffered on the downstream side of the mounter 104 becomes smaller, that is, when the second dancer roller 162 moves up and is detected by the upper position sensor 174 for the second dancer roller (when the sensor 174 is turned on), the collecting reel motor 142 stops (turns off) the rotational drive of the collecting reel 140.

When mounting of the RFIC module 14 on the part of the roll sheet S on the suction table 136 is finished (when the mounting operation is finished), the roller pair 150 nips the roll sheet S therebetween, as illustrated in FIGS. 10 and 12. In other words, the nip roller 154 moves from the retracted position to a nipping position where the nip roller is brought into contact with the sheet conveying roller 152, with the roll sheet S interposed therebetween. When the nip roller 154 reaches the nipping position (the roller pair 150 nips the roll sheet S), the suction table 136 stops suctioning (releases the roll sheet S), and is moved down toward the retracted position so as to become separated from the roll sheet S.

As illustrated in FIG. 10, when the suction table 136 starts moving down toward the retracted position, the sheet conveying motor 156 starts driving the sheet conveying roller 152 included in the roller pair 150 (is turned on). As a result, the part of the roll sheet S on which the RFIC modules 14 have been mounted is carried out of the mounter 104. At this time, because the suction table 136 has been separated, no friction is generated between the suction table 136 and the roll sheet S. As a result, the sheet conveying roller 152 can be rotated with a small driving force (e.g., torque) of the sheet conveying motor 156 (as compared with when a friction is generated between the suction table 136 and the roll sheet S). It is also possible to suppress wearing of at least one of the suction table 136 and the roll sheet S, and to suppress charging of, or prevent the roll sheet S from becoming charged. The sheet conveying motor 156 keeps driving the sheet conveying roller 152 in rotation until the part of the roll sheet S on which the RFIC modules 14 have mounted is completely discharged from the mounter 104, more specifically, from the position on the suction table 136.

While the roll sheet conveying roller 152 included in the roller pair 150 is conveying the roll sheet S, the meandering of the roll sheet S is suppressed by the behaviors of the first dancer roller 160 and the second dancer roller 162, as illustrated in FIG. 9.

As further illustrated in FIG. 10, before the part of the roll sheet S on which the RFIC modules 14 have been mounted is completely discharged from the mounter 104, that is, at the timing when a predetermined time t1 has elapsed after the sheet conveying motor 156 starts driving the sheet conveying roller 152 in rotation, the suction table 136 starts moving up from the retracted position to the supporting position where the suction table 136 is brought into contact with the roll sheet S. The predetermined time t1 is a time required for the suction table 136 to arrive at the supporting position at the timing when the part of the roll sheet S having the RFIC modules 14 mounted thereon is fully carried out of the mounting position MP.

When the suction table 136 starts suctioning at the same time as the suction table 136 arrives at the supporting position, the sheet conveying motor 156 stops rotating (turns off) the sheet conveying roller 152. As a result, the conveyance of the roll sheet S is stopped. At substantially the same time, the nip roller 154 is separated from the sheet conveying roller 152, and starts moving up toward the retracted position. After the nip roller 154 reaches the retracted position, the mounter 104 starts mounting the RFIC module 14 on the roll sheet S.

When the sheet conveying motor 156 drives the sheet conveying roller 152 in rotation, as illustrated in FIG. 12, the part of the roll sheet S on the suction table 136 (the part having mounting of the RFIC module 14 completed) is caused to move. As a result, the buffered amount of the roll sheet S on the upstream of the mounter 104 decreases, and the first dancer roller 160 moves up. As illustrated in FIG. 10, when the sheet conveying motor 156 is stopped (turned OFF), the upper position sensor 170 for the first dancer roller detects the first dancer roller 160 (is turned ON). At the timing at which the first dancer roller 160 is detected, the feed reel motor 118 starts rotating the feed reel 114, so that the first dancer roller 160 newly buffers the roll sheet S on the upstream side of the mounter 104.

When the sheet conveying motor 156 drives the sheet conveying roller 152 in rotation, the part of the roll sheet S that is on the suction table 136 (the part where which the mounting of the RFIC module 14 has been finished) is caused to move. As a result, the buffered amount of the roll sheet S downstream of the mounter 104 increases, and the second dancer roller 162 moves down. As illustrated in FIG. 10, when the sheet conveying motor 156 is stopped (turned OFF), the lower position sensor 176 for the second dancer roller detects (is turned ON) the second dancer roller 162. At the timing at which the second dancer roller 162 is detected, the collecting reel motor 142 starts rotating the collecting reel 140, and the collecting reel 140 starts winding the roll sheet S being buffered downstream of the mounter 104.

According to the above embodiment, in the wireless communication device that includes an RFIC module including an RFIC chip and an antenna pattern, the RFIC modules can be fixed to the antenna base material 16 (roll sheet S) that is provided with the antenna pattern in a short time.

Specifically, the pressure-sensitive adhesive layers 42 for fixing the RFIC modules 14 to the roll sheet S are provided on the roll sheet S, instead of on the respective RFIC modules 14. Therefore, the RFIC module 14 can be picked up in a short time.

With such a configuration, because the pressure-sensitive adhesive layers 42 are provided on the roll sheet S, it is necessary to convey the pressure-sensitive adhesive layers 42 accurately to the mounting position MP of the RFIC module 14. Because the first dancer roller 160 and the second dancer roller 162 suppress meandering of the roll sheet S, the pressure-sensitive adhesive layers 42 on the roll sheet S can be conveyed accurately to the mounting position MP.

It is noted that although the exemplary embodiment and aspect of the present invention have been explained with reference to the embodiments described above, the embodiments of the present invention are not limited thereto.

For example, in the embodiment described above, one roller 152 of the roller pair 150 is a sheet conveying roller that is driven by the sheet conveying motor 156 in rotation and that conveys the roll sheet S, but the exemplary embodiment of the present invention is not limited thereto. For example, both of the rollers in the roller pair may be idle rollers configured for freely rotating. In such a configuration, the collecting reel rotationally driven by the collecting reel motor may function as a roll sheet conveying unit. Alternatively, another conveying roller may be provided on the path along which the roll sheet is conveyed. In this case, the roll pair may be disposed downstream of the mounter, for example, between the mounter and the roll sheet collecting device included in the conveyor.

In the example of the embodiment described above, the roll sheet S on which the RFIC modules 14 have been mounted is wound around the collecting reel 140. However, the exemplary embodiment of the present invention is not limited thereto. The roll sheet on which the RFIC modules have been mounted may be conveyed to an apparatus that performs another process, without being wound around the collecting reel. For example, the roll sheet may be conveyed into an apparatus that cuts the roll sheet into a plurality of pieces to form a plurality of wireless communication devices.

Furthermore, in the example of the embodiment described above, the suction table 136 that suctions and supports the part of the roll sheet S located at the mounting position MP is provided in the wireless communication device manufacturing system 100, as illustrated in FIG. 5. As long as the first dancer roller and the second dancer roller are balanced and configured to maintain the roll sheet still at the mounting position, it is also possible to provide a table for supporting the roll sheet without suctioning the support roll.

Furthermore, in the example of the embodiment described above, while the suction table 136 is suctioning the roll sheet S, the roller pair 150 releases the roll sheet S, as illustrated in FIGS. 10 and 12. As a result, the roll sheet S with no wrinkling or slacking is suctioned onto the suction table 136. However, when the roll sheet is thick and is less likely to become wrinkled or slacken, the roller pair may keep the roll sheet nipped therebetween while the roll sheet is being suctioned by the suction table.

In addition, in the example of the embodiment described above, the suction table 136 is moved down and separated from the roll sheet S while the roll sheet S is being conveyed, as illustrated in FIGS. 10 and 11. In this manner, the friction between the roll sheet S being conveyed and the suction table 136 is eliminated, and wearing of at least one of the roll sheet S and the suction table is suppressed. However, when the friction between the roll sheet S and the suction table is small, the roll sheet S may be conveyed in a manner sliding across the suction table. With such a configuration, the mechanism for moving up and down the suction table can be omitted.

In addition, in the example of the embodiment described above, the RFIC module 14 is fixed to the antenna base material 16 (roll sheet S) with the pressure-sensitive adhesive layer 42 interposed therebetween. However, the exemplary embodiment of the present invention is not limited thereto. Instead of the pressure-sensitive adhesive layers 42, for example, the RFIC module may be fixed to the antenna base material with a layer of hot-melt adhesive interposed therebetween in an alternative exemplary aspect. In such a case, a heating apparatus, such as a heater, that heats and softens the hot melt adhesive is used.

In addition, in the example of the embodiment described above, an adhesive layer for fixing the RFIC module 14 to the antenna base material 16 (roll sheet S) is provided to the antenna base material 16 in advance. Alternatively, an adhesive layer may be provided to the RFIC module 14 in advance.

In other words, an embodiment of the present disclosure is generally a wireless communication device manufacturing system for fixing an RFIC module including an RFIC chip to an antenna base material including an antenna pattern. In an exemplary aspect, the wireless communication device manufacturing system includes a conveyor that conveys the antenna base material to which the RFIC module is fixed via an insulating adhesive layer so as to pass through a mounting position of the RFIC module; a mounter that mounts the RFIC module on the antenna base material via the adhesive layer at the mounting position; a roller pair that nips the antenna base material after mounting of the RFIC module in a thickness direction thereof and presses the RFIC module against the adhesive layer; a first dancer roller that is placed on the antenna base material in a freely movable state on an upstream side in a conveying direction of the antenna base material with respect to the mounter; and, a second dancer roller placed on the antenna base material in a freely movable state, wherein each of the first and second dancer rollers includes a cylindrical portion placed on the antenna base material, and locking portions provided at both ends of the cylindrical portion.

The invention claimed is:

1. A wireless communication device manufacturing system for fixing an RFIC module that includes an RFIC chip to an antenna base material including an antenna pattern, the system comprising:

a conveyor configured to convey the antenna base material to pass through a mounting position; a suction table configured to suction and support the antenna base material at the mounting position;

a mounter configured to mount, at the mounting position, the RFIC module on the antenna base material with an adhesive layer interposed therebetween;

a roller pair configured to nip the antenna base material having the RFIC module mounted thereon, in a thickness direction of the antenna base material, and to press the RFIC module against the adhesive layer, the roller pair including two rollers that are configured to separate from each other and to release the antenna base material while the antenna base material is being suctioned by the suction table;

a first dancer roller freely movably in a height direction and disposed on the antenna base material on an upstream side of the mounter in a conveying direction of the antenna base material and configured to be kept in contact with the antenna base material by its own weight; and a second dancer roller freely movably in a height direction and disposed on the antenna base material on a downstream side of the roller pair in the conveying direction and configured to be kept in contact with the antenna base material by its own weight, wherein each of the first dancer roller and the second dancer roller includes a cylindrical portion configured to receive the antenna base material and locking portions provided at respective ends of the cylindrical portion.

2. The wireless communication device manufacturing system according to claim 1, wherein the locking portions of the first dancer roller and the second dancer roller are configured to suppress a meandering of the antenna base material.

3. The wireless communication device manufacturing system according to claim 1, wherein, when the suction table suctions the antenna base material and the roller pair then releases the antenna base material, the mounter is configured to start placing the RFIC module on the adhesive layer to be mounted thereon.

4. The wireless communication device manufacturing system according to claim 1, wherein the suction table is configured to be movable up and down, such that the suction table is moved down and separated from the antenna base material while the antenna base material is being conveyed.

5. The wireless communication device manufacturing system according to claim 1, wherein the conveyor includes a collecting reel that is disposed downstream of the second dancer roller in the conveying direction, and is configured to wind and collect the antenna base material having the RFIC module mounted thereon.

6. The wireless communication device manufacturing system according to claim 1, wherein the roller pair is provided to the conveyor, and one roller of the roller pair is a conveying roller that is configured to convey the antenna base material.

7. The wireless communication device manufacturing system according to claim 1, wherein the adhesive layer is provided, in advance, to a part of the antenna base material to which the RFIC module is to be fixed.

8. The wireless communication device manufacturing system according to claim 1, wherein the first dancer roller and the second dancer roller are placed on the antenna base material, and are kept in contact with the antenna base material based on respective own weights.

9. The wireless communication device manufacturing system according to claim 1, wherein the mounter includes a camera configured to capture an image of the RFIC module that is picked up by a suction nozzle of the mounter.

10. The wireless communication device manufacturing system according to claim 9, wherein the camera of the mounter is configured to determine a posture and orientation of the RFIC module picked up by the suction nozzle and based on the captured image.

11. The wireless communication device manufacturing system according to claim 10, wherein the mounter is configured to mount the RFIC module on the adhesive layer based on the determined posture and orientation, such that respective coupled portions of the antenna pattern face a pair of terminal electrodes of the RFIC module.

12. The wireless communication device manufacturing system according to claim 1, wherein the first dancer roller and the second dancer roller are freely movable such that the first dancer roller and the second dancer roller are not supported by any of the conveyor and the mounter.

13. A wireless communication device manufacturing system for fixing an RFIC module that includes an RFIC chip to an antenna base material including an antenna pattern, the system comprising:

a conveyor configured to convey the antenna base material to pass through a mounting position; a suction table configured to suction and support the antenna base material at the mounting position;

a mounter configured to mount, at the mounting position, the RFIC module on the antenna base material with an adhesive layer interposed therebetween;

a nip roller configured to nip the antenna base material having the RFIC module mounted thereon, in a thickness direction of the antenna base material, and to press the RFIC module against the adhesive layer, the roller pair including two rollers that are configured to separate from each other and to release the antenna base material while the antenna base material is being suctioned by the suction table; and at least one dancer roller freely movably in a height direction and disposed on the antenna base material on at least one of an upstream side and a downstream side of the mounter in a conveying direction of the antenna base material and configured to be kept in contact with the antenna base material by its own weight, wherein the at least one dancer roller includes a cylindrical portion configured to receive the antenna base material and locking portions provided at respective ends of the cylindrical portion.

14. The wireless communication device manufacturing system according to claim 13, wherein the at least one dancer roller comprises:

a first dancer roller disposed on the antenna base material on the upstream side of the mounter in the conveying direction of the antenna base material; and a second dancer roller disposed on the antenna base material on the downstream side of the roller pair in the conveying direction.

15. The wireless communication device manufacturing system according to claim 13, wherein the locking portions of the at least one dancer roller are configured to suppress a meandering of the antenna base material.

16. The wireless communication device manufacturing system according to claim 13, further comprising a suction table configured to suction and support the antenna base material at the mounting position.

17. A wireless communication device manufacturing system for fixing an RFIC module that includes an RFIC chip to an antenna base material including an antenna pattern, the system comprising:

a conveyor configured to convey the antenna base material to pass through a mounting position;

a mounter configured to mount, at the mounting position, the RFIC module on the antenna base material with an adhesive layer interposed therebetween;

a nip roller configured to nip the antenna base material having the RFIC module mounted thereon, in a thickness direction of the antenna base material, and to press the RFIC module against the adhesive layer;

at least one dancer roller freely movably and disposed on the antenna base material on at least one of an upstream side and a downstream side of the mounter in a conveying direction of the antenna base material; and a suction table configured to suction and support the antenna base material at the mounting position, wherein the nip roller includes two rollers that are configured to separate from each other and to release the antenna base material while the antenna base material is being suctioned by the suction table, and wherein the at least one dancer roller includes a cylindrical portion configured to receive the antenna base material and locking portions provided at respective ends of the cylindrical portion.

18. The wireless communication device manufacturing system according to claim 17, wherein, when the suction table suctions the antenna base material and the nip roller then releases the antenna base material, the mounter is configured to start placing the RFIC module on the adhesive layer to be mounted thereon.

* * * * *